(12) United States Patent
Schandel et al.

(10) Patent No.: US 8,109,201 B2
(45) Date of Patent: Feb. 7, 2012

(54) KITCHEN APPLIANCE FOR HEATING FOODSTUFF

(75) Inventors: David Schandel, Richmond, VA (US); Cuong Truong, Morrisville, NC (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 391 days.

(21) Appl. No.: 12/416,448

(22) Filed: Apr. 1, 2009

(65) Prior Publication Data

US 2010/0251902 A1 Oct. 7, 2010

(51) Int. Cl.
*A47J 37/00* (2006.01)
*B65D 8/04* (2006.01)

(52) U.S. Cl. ............... 99/340; 99/426; 206/563
(58) Field of Classification Search .......... 99/426, 99/403, 339, 340, 400; 219/621, 725; 206/563, 206/564, 426; 220/573.4; 248/37.3
See application file for complete search history.

(56) References Cited

U.S. PATENT DOCUMENTS

| | | | | |
|---|---|---|---|---|
| 1,771,294 A | * | 7/1930 | Hackett | 269/16 |
| 3,635,371 A | * | 1/1972 | Oxel | 220/605 |
| 3,746,837 A | | 7/1973 | Frey et al. | |
| D368,620 S | * | 4/1996 | Piret | D7/354 |
| 5,678,790 A | * | 10/1997 | Dwyer | 248/37.6 |
| 5,715,570 A | | 2/1998 | Hyun | |
| 5,829,342 A | * | 11/1998 | Lee | 99/348 |
| 5,945,024 A | | 8/1999 | Fukunaga et al. | |
| 6,062,130 A | * | 5/2000 | Brady | 99/332 |
| 6,109,169 A | * | 8/2000 | Masel et al. | 99/334 |
| 6,606,987 B2 | * | 8/2003 | DeMars | 126/38 |
| 6,772,677 B2 | | 8/2004 | Marotel et al. | |
| 6,776,085 B1 | * | 8/2004 | Tang | 99/375 |
| 7,167,642 B1 | * | 1/2007 | Wagner | 392/441 |
| 7,485,831 B2 | * | 2/2009 | Tynes et al. | 219/433 |
| 7,717,028 B2 | | 5/2010 | Serra | |
| 7,947,928 B2 | * | 5/2011 | Tynes et al. | 219/433 |
| 2002/0073851 A1 | * | 6/2002 | Chung et al. | 99/327 |
| 2003/0234205 A1 | * | 12/2003 | McGuyer et al. | 206/564 |
| 2005/0145615 A1 | * | 7/2005 | Schaffeld et al. | 219/440 |
| 2008/0084144 A1 | * | 4/2008 | D'Ambrosio | 312/137 |
| 2009/0039071 A1 | * | 2/2009 | Tynes et al. | 219/433 |
| 2009/0218355 A1 | | 9/2009 | Chameroy et al. | |
| 2009/0272279 A1 | * | 11/2009 | Kieck | 99/468 |
| 2010/0059460 A1 | * | 3/2010 | Mulaw | 211/41.3 |
| 2011/0061545 A1 | * | 3/2011 | Foster et al. | 99/407 |

* cited by examiner

*Primary Examiner* — Steven Wong
(74) *Attorney, Agent, or Firm* — Panitch Schwarze Belisario & Nadel LLP

(57) ABSTRACT

A kitchen appliance for heating foodstuff includes a container defining a heating cavity therein. The container is positioned on a supporting surface during heating of the foodstuff. The kitchen appliance further includes a utensil for manipulating the foodstuff. The utensil has a first and opposite second end. A tray is slidably positioned within a portion of the container. The tray is movable between a storage position in which the tray is substantially within the container and a use position in which the tray is at least partially removed from the container. The tray has a concave portion on a top surface thereof. The concave portion is sized and shaped to support at least a portion of the first end of the utensil above the supporting surface.

17 Claims, 7 Drawing Sheets

KITCHEN APPLIANCE FOR HEATING FOODSTUFF

BACKGROUND OF THE INVENTION

The present invention relates to a kitchen appliance for heating foodstuff and, in particular, to a slow cooker or other cooking apparatus which reduces the mess and the potential spread of germs commonly associate with the use of conventional kitchen appliances.

Slow cookers are generally known and typically include a ceramic or stoneware container received in a metal housing. Typically, a transparent glass or plastic lid is removably mounted on the container. The housing typically has an electrically-operated control and heating element for heating foodstuff placed within the container. The housing generally has handles extending therefrom to allow a user to relatively easily pick up and move the slow cooker. Often, the user may want to move the slow cooker after it is loaded with the foodstuff to be cooked.

Spoons and/or other utensils are typically desired for tending to and/or serving foodstuff from within the slow cooker. However, between servings of the foodstuff from the slow cooker, it is often difficult and inconvenient for the user to find a sanitary location to temporarily store and/or rest the utensil. Further, if it is desired that the slow cooker be stored for an extended period of time, it can be inconvenient to find a location to store the utensil along with the slow cooker. Therefore, it would be desirable to provide a slow cooker with structure that provides a temporary and/or a long-term storage location for a utensil.

BRIEF SUMMARY OF THE INVENTION

Briefly stated, the present invention is directed to a kitchen appliance for heating foodstuff. The kitchen appliance includes an outer shell, having an upper surface and a lower surface, and a base that encloses the lower surface of the outer shell. The base is positioned on a supporting surface during heating of the foodstuff and the outer shell and the base define the heating cavity therein. A heating element is disposed within the outer shell sufficiently proximate the heating cavity to heat the heating cavity. A cooking pot has a generally hollow interior and a cooking pot rim defining an opening for accessing the interior thereof; the interior is capable of retaining foodstuff therein. The cooking pot is sized and shaped to fit within the heating cavity for heating thereof by the heating element. A component, which is movably positioned within a portion of the kitchen appliance, is sized and shaped to support at least a portion of a utensil above the supporting surface. The component is movable between a storage position in which the component is substantially within the kitchen appliance and a use position in which the component is at least partially removed from the kitchen appliance.

In another aspect, the present invention is directed to a kitchen appliance for heating foodstuff. The kitchen appliance includes a container defining a heating cavity therein. The container is positioned on a supporting surface during heating of the foodstuff. A heating element is disposed within the container proximate the heating cavity to heat the heating cavity. A cooking pot has a generally hollow interior and a cooking pot rim defining an opening for accessing the interior thereof; the interior is capable of retaining foodstuff therein. The cooking pot is sized and shaped to fit within the heating cavity for heating thereof by the heating element. The kitchen appliance further includes a utensil for manipulating the foodstuff. The utensil has a first end and an opposite second end. A tray is slidably positioned within a portion of the container. The tray is movable between a storage position in which the tray is substantially within the container and a use position in which the tray is at least partially removed from the container. The tray has a concave portion on a top surface thereof. The concave portion is sized and shaped to support at least a portion of the first end of the utensil above the supporting surface.

BRIEF DESCRIPTION OF THE SEVERAL VIEWS OF THE DRAWINGS

The foregoing summary, as well as the following detailed description of two preferred embodiments of the invention, will be better understood when read in conjunction with the appended drawings. For the purpose of illustrating the invention, there is shown in the drawings two embodiments which are presently preferred. It should be understood, however, that the invention is not limited to the precise arrangements and instrumentalities shown.

In the drawings.

DETAILED DESCRIPTION OF THE INVENTION

Figure 1:
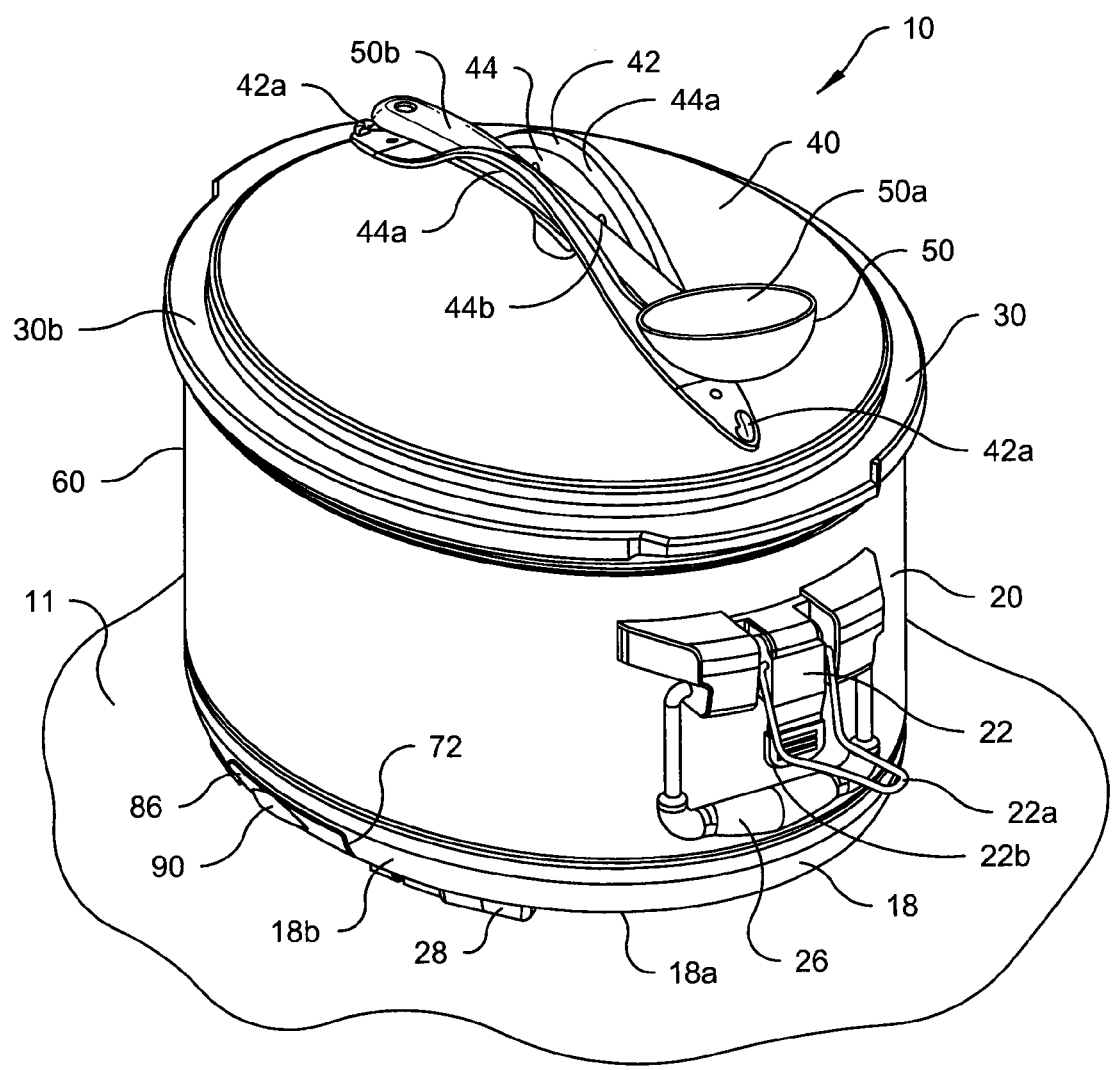
FIG. 1 is a rear top perspective view of a slow cooker in accordance with a first preferred embodiment of the present invention.

Certain terminology is used in the following description for convenience only and is not limiting. The words "right," "left," "upper," and "lower" designate directions in the drawings to which reference is made. The words "inwardly" and "outwardly" refer to directions toward and away from, respectively, the geometric center of the kitchen appliance and designated parts thereof. The terminology includes the words above specifically mentioned, derivatives thereof, and words of similar import.

Referring to the drawings in detail, wherein like numerals indicate like elements throughout, there is shown in FIGS. 1-6 a first preferred embodiment of a kitchen appliance, generally designated 10, for warming and/or cooking, collectively referred to as heating, foodstuff (not shown). Preferably, the kitchen appliance 10 is a slow cooker, but the kitchen appliance 10 could be some other product such as a crock pot, steamer machine or deep fryer, for example. The slow cooker 10 preferably includes a container 60 defining a heating cavity 64 therein for receiving the foodstuff and a lid 40 removably mountable to the container 60. The container 60 is preferably ovular or circular in shape when viewed from above or below and includes an upper, open end and a lower, closed end. A sidewall generally orthogonally extends from the lower, closed end and has an interior surface and an exterior surface. The lid 40 is removably mountable to the upper, open end of the container 60 to enclose the foodstuff therein.

Figure 2:
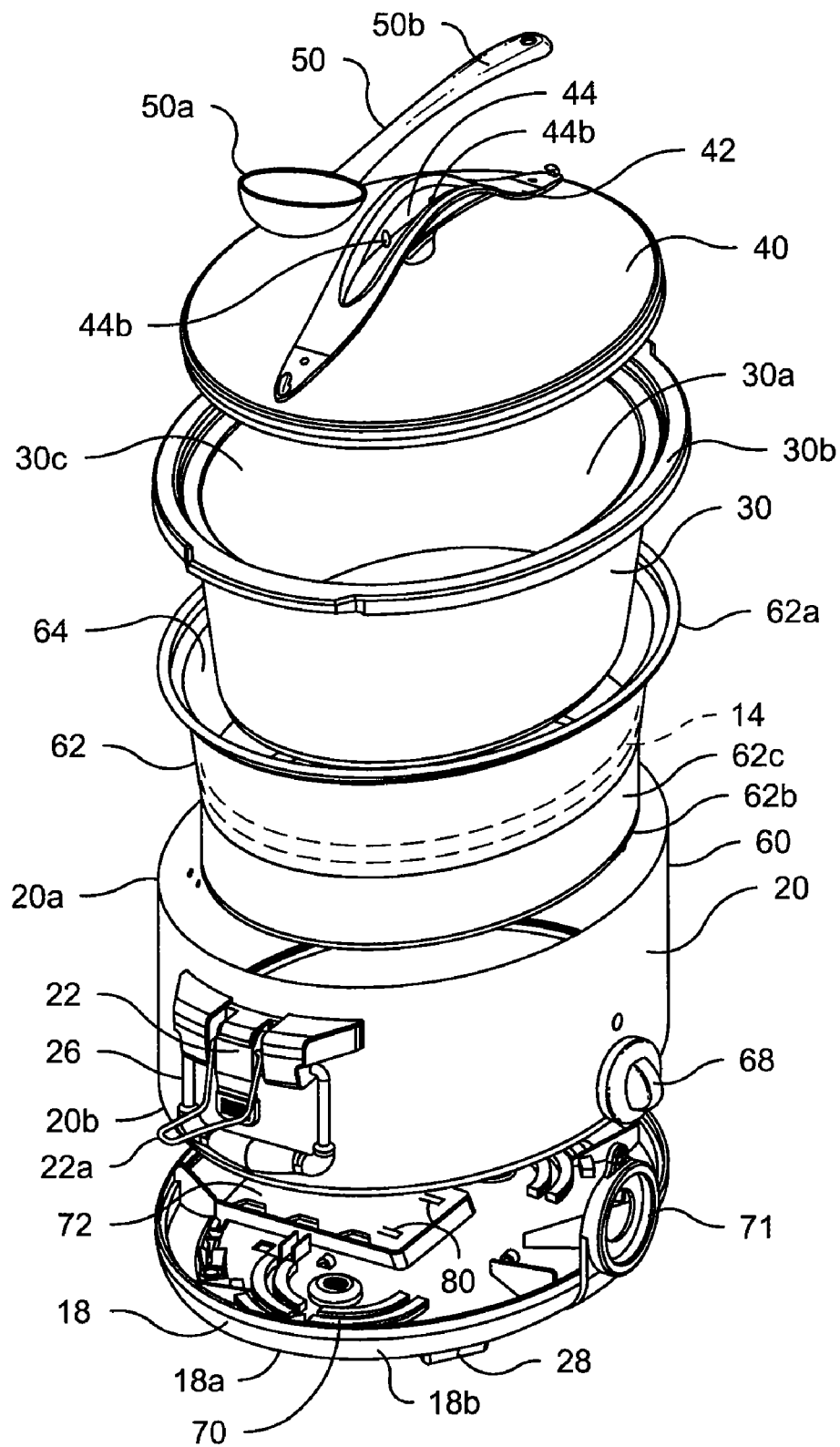
FIG. 2 is an exploded right side perspective view of the slow cooker of FIG. 1.
Figure 3:
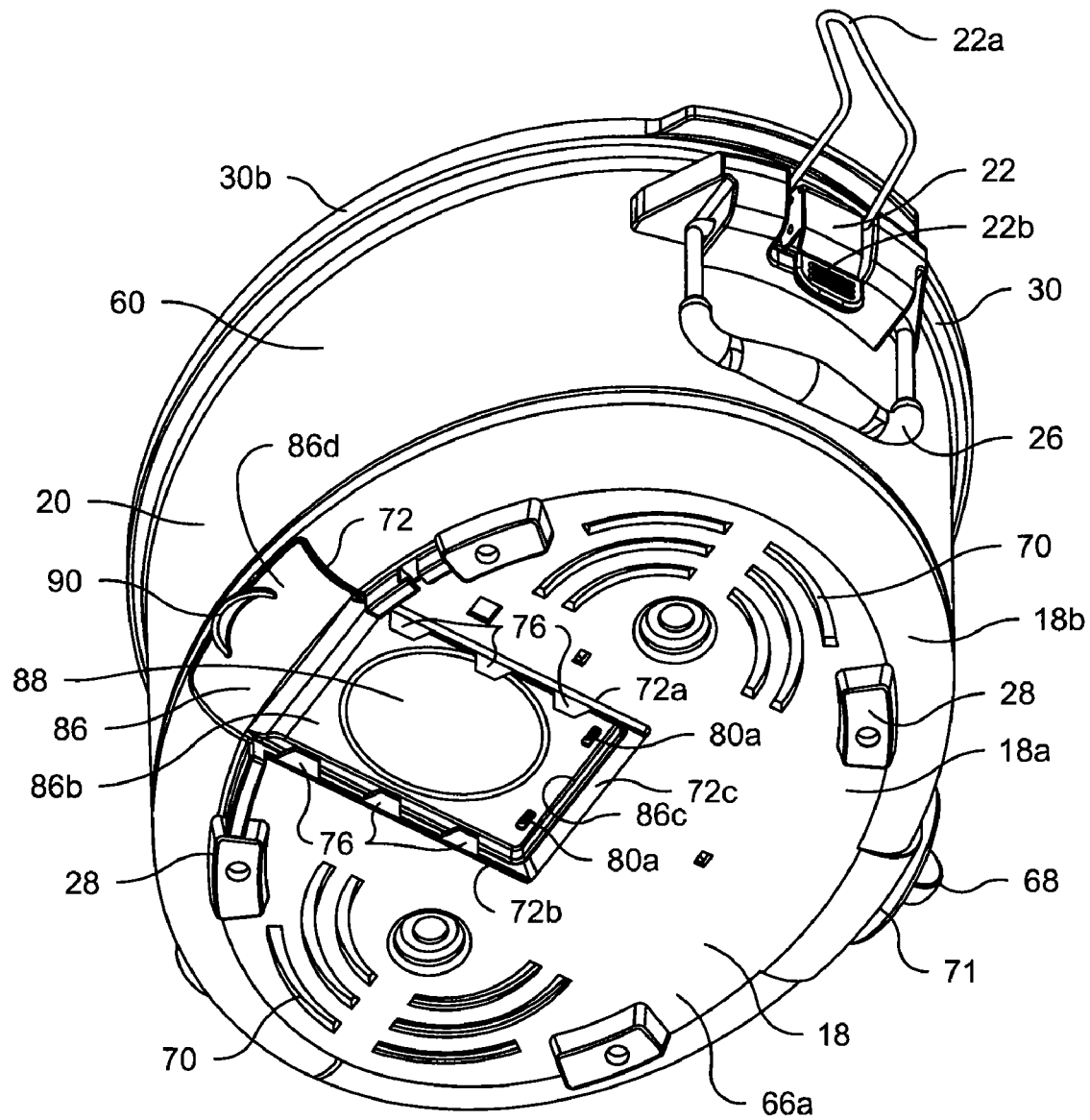
FIG. 3 is a rear bottom perspective view of the slow cooker of FIG. 1.

Referring to FIGS. 1-3, the container 60 preferably includes a base 18, an outer shell or wrap 20, an inner shell 62 and a cooking pot 30. Preferably, the heating cavity 64 is defined within the interior of the inner shell 62. A heating element 14 (shown in phantom in FIG. 2) is disposed within the container 60 sufficiently proximate the heating cavity 64 to heat the heating cavity 64. Preferably, the heating element 14 is disposed on an interior or exterior surface of the inner shell 62, although the heating element 14 may be located within or on the interior surface of the outer shell 20 in addition to or instead of on the inner shell 62. The heating element 14 is preferably generally conventional, in that it is preferably electrically powered and is a resistance-type heating element, such as a calrod or mica board heating element. Although such a heating element 14 is preferred, a different type of heating element may be used, provided the heating element 14 functions to heat the heating cavity 64 of the container 60. It is understood by those skilled in the art that the container 60 is not limited to the inclusion of the above-recited parts, but may include more or less parts. For example, the container 60 may not include the inner shell 62, in which case the outer shell 20 and the base 18 would define the heating cavity 64 therein.

As seen in FIG. 2, the outer shell 20 has an upper open surface or rim 20a and a lower open surface or rim 20b. The outer shell 20 has an exterior surface exposed to the external environment and an internal surface that faces the interior of the slow cooker 10. The outer shell 20 is generally ovular or circular in shape and is preferably formed of a high-strength, light-weight material, such as a metallic material. As seen in FIG. 2, the outer shell 20 is a relatively thin layer or structure that encloses and protects the interior structure of the slow cooker 10. As seen in FIGS. 1-3, the outer shell 20 of the slow cooker 10 preferably includes one or more handles 26 extending outwardly therefrom to enable the user to grasp and lift the assembled slow cooker 10 for movement thereof. Preferably, the handles 26 are in diametrically opposed relation to one another and are disposed along a major axis of the generally ovular outer shell 20. In the preferred embodiment, the handles 26 are pivotally mounted to the outer shell 20.

Preferably, a control knob 68 extends outwardly from the exterior surface of the outer shell 20 and is operatively connected to the heating element 14 to enable a user to control the heating element 14. It is preferred that rotation of the knob 68 by the user toggles the heating element 14 between at least one on setting and an off setting. It is further preferred that the heating element 14 have at least two on settings, specifically a high heat setting and a low heat setting. Although two heat settings are preferred, it is further contemplated that alternate configurations that are generally conventional in the art be used, such as, but not limited to, rotation of the knob 68 actuating a thermostat (not shown) to cause the heating element 14 to heat the heating cavity 64 to a specific user selected temperature. The control knob 68 may be used in conjunction with or replaced by one or more control buttons (not shown).

Referring again to FIG. 2, the inner shell 62 has an upper open surface or rim 62a and a lower closed surface 62b. A side wall 62c generally orthogonally extends from the lower closed surface 62b to the rim 62a. The inner shell 62 has an exterior surface exposed to an internal surface of the outer shell 20 and an interior surface generally facing the geometric center of the slow cooker 10. The heating element 14 preferably warps around the exterior surface of the inner shell 62 at a general midsection of the side wall 62c. The inner shell 62 is generally ovular or circular in shape to conform to the shape of the outer shell 20 and is preferably formed of a high-strength, light-weight material, such as a metallic material. The upper surface or rim 62a of the inner shell 62 is preferably fixedly or permanently attached to the upper rim 20a of the outer shell 20. However, the inner shell 62 may be removably attached to the outer shell 20 by one or more fasteners (not shown), such as screws, bolts, rivets, friction fitting, adhesive or the like. For example, as seen in FIG. 2, the upper rim 20a of the outer shell 20 may be curved outwardly and downwardly to form a groove or channel with the exterior surface of the outer shell 20. The upper rim 20a of the outer shell 20 may be removably or fixedly received in the groove.

Referring to FIGS. 1-3, the slow cooker 10 further includes a cooking pot 30 having a generally hollow interior 30a and a cooking pot rim 30b defining an opening 30c for accessing the interior 30a. The interior 30a is capable of retaining the foodstuff therein. The cooking pot 30 is preferably shaped and sized to fit within the heating cavity 64 for heating thereof by the heating element 14. The cooking pot 30 is preferably made of stoneware or ceramic, as is conventional in the slow cooker art. While a stoneware or ceramic container is preferred, the cooking pot 30 may be made of a different material, such as cast iron with a porcelain enamel coating, for instance, provided the cooking pot 30 is capable of functioning as described herein. Additionally, it is preferable that the container 30 be easily removable from the container 60 to facilitate cleaning thereof without exposing the container 60, and specifically the heating element 14 and other electrical components thereof, to water and/or cleaning detergents or solvents.

Referring to FIGS. 1 and 2, the slow cooker 10 further includes the lid 40 sized and shaped to at least partially and preferably generally completely cover the opening 30c of the cooking pot 30 when the lid 40 is placed on the cooking pot rim 30b. The lid 40 is preferably generally ovular when viewed from above or below to correspond to the shape of the opening 30c of the cooking pot 30 and/or container 60. Preferably, when placed on the cooking pot rim 30b, the lid 40 entirely covers the opening 30c of the cooking pot 30. The lid 40 is preferably predominantly made of glass, although it is contemplated that the lid 40 be made of a different, preferably transparent or translucent material, such as a polymeric material, for instance, provided the lid 40 functions as described herein.

The lid 40 preferably includes an elongate handle 42 on a top surface thereof, preferably disposed generally along a major axis of the preferably ovular lid 40. The handle 42 is preferably formed from a polymeric material, such as, but not limited to, plastic, and is affixed to the lid 40 via fasteners, such as bolts, screws, rivets, or some other suitable fastener. Alternatively, it is contemplated that the handle 42 could be affixed to the lid 40 using an adhesive or some other fastening method. Moreover, while it is preferred that the handle 42 be separately formed and affixed to the lid 40, it is within the spirit and scope of the present invention that the lid 40 be made of a polymeric material, such as plastic, and that the handle 42 be integrally formed with the lid 40. The handle 42 preferably has a slot 44 formed therein by a pair of generally parallel side walls 44a extending upwardly from the top surface of the lid 40. Further aspects of the slot 44 will be discussed in greater detail below.

Referring again to FIGS. 1 and 2, the slow cooker 10 further includes a utensil 50 for manipulating the foodstuff within the cooking pot 30. The utensil 50 is preferably a large serving spoon or ladle, although the utensil may be of another type, such as a fork, spatula, or the like. The spoon 50 is preferably removably engagable with the handle 42 of the lid 40. Specifically, the slot 44 of the handle 42 is preferably appropriately sized and shaped to accept at least a portion of the spoon 50. Preferably, the spoon 50 includes a bowl 50a attached at one end of a stem or handle 50b. At least a portion of the handle 50b is sized to fit within the slot 44 so that the spoon 50 can rest within the slot 44 on top of the lid 40 in a storage or resting position, as shown in FIG. 1. The side walls 44a of the slot 44 preferably each include at least one detent or protrusion 44b extending inwardly therefrom to at least assist in retaining the spoon 50 within the slot 44.

It is preferable that each side wall 44a include two spaced apart protrusions 44b extending inwardly therefrom which engage the handle 50b of the spoon 50 with a snap fit to retain the spoon 50 within the slot 44. While this configuration is preferred, the slot 44 may include more or less than four protrusions 44b therein to retain the spoon 50 therein. Moreover, it is contemplated that the slot 44 include no protrusions and that the spoon 50 be retained within the slot 44 by a friction fit created between the side walls 44a with the spoon 50 or that the spoon 50 merely rest within the slot 44 without any engagement thereof by the slot 44. In either event, it is preferred that the spoon 50 be able to be removed from within the slot 44 with a minimal amount of force being applied to the spoon 50 by the user.

Referring again to FIGS. 1 and 2, the slow cooker 10 includes at least one clip 22 for selectively retaining the lid 40 in engagement with the cooking pot rim 30b to inhibit leakage of the foodstuff from within the interior 30a of the cooking pot 30. The at least one clip 22 is a generally conventional over-the-center clip having a hook 22a and a lever 22b, such that manipulation of the lever 22b causes engagement or release of the hook 22a of the clip 22. The at least one clip 22 is preferably attached to the exterior surface of the outer shell 20, proximate the top thereof, with the hook 22a shaped to be extendable from the lever 22b and around the cooking pot rim 30b when the cooking pot 30 is disposed within the heating cavity 64 of the container 60. Preferably, the hook 22a is selectively releasably engagable with the lid 40 with movement of the lever 22b to selectively retain the lid 40 in sealing engagement with the cooking pot rim 30b. It is preferred that the lid 40 includes at least one catch 42a in the form of a small, slightly hooked, elongate protrusion extending outwardly from the lid 40 to selectively engage the hook 22a of the clip 22.

When the hook 22a is placed around the catch 42a, the lever 22b of the clip 22 can be rotated downwardly and inwardly toward the exterior surface of the outer shell 20 to create a retaining force exerted by the clip 22 on the lid 40 in order to retain the lid 40 on the container rim 30b. To release the clip 22, the lever 22b is rotated outwardly and upwardly with respect to the exterior surface of the outer shell 20 to release the retaining force, thereby placing the clip 22 in an intermediate position. Once in this position, the hook 22a of the clip 22 can be removed from engagement with the catch 42a of the handle 42 to place the clip 22 in the released position 25 and enable the lid 40 to be removed from engagement with the cooking pot rim 30b. Preferably, the exterior surface of the outer shell 20 includes two clips 22 in diametrically opposed relation in order to better selectively retain the lid 40 on the cooking pot rim 30b.

As seen in FIGS. 1-6, the base 18 encloses and is preferably fixed to the lower surface 20b of the outer shell 20. The base 18 has a bottom portion 18a, preferably supported by a supporting surface 11 such as a countertop or a table top, and an arcuate shaped side wall 18b extending therefrom. The base 18 is preferably positioned directly on the supporting surface 11 during heating of the foodstuff and, thus, operation of the kitchen appliance 10. The base 18 is generally ovular in shape when viewed from above or below with the side wall 18b extending generally perpendicularly upwardly therefrom. While the ovular shape is preferred, the base 18 may have a different shape, such as, but not limited to, circular in plan view.

In the preferred embodiment, the base 18 includes at least two, but preferably four, generally spaced-apart, rectangular protrusions or feet 28 (FIGS. 1, 3, 5, 6) extending downwardly from a bottom or exterior surface 66a of the bottom portion 18a for supporting the slow cooker 10 on the supporting surface 11 and preferably spacing the base 18 slightly from the supporting surface 11. While it is preferred that the slow cooker 10 includes a plurality of feet 28, there may be more or less feet 28 or the feet 28 may be shaped differently, provided the feet 28 are capable of functioning in the manner described herein. Additionally, it is contemplated that the slow cooker 10 include no feet and that the slow cooker 10 be supported by the bottom portion 18a directly on the supporting surface 11. Further, a plurality of generally arcuate openings 70 are concentrically located within the bottom portion 18a of the base 18 and provide a passageway to promote the flow of air into and out of the slow cooker 10 to help cool the slow cooker 10 when the heating element 14 is operating. As seen in FIGS. 2-6, a face plate 71, which generally surrounds the control knob 68 when the slow cooker 10 is in an assembled configuration (FIG. 1), is preferably fixedly or integrally form with the base 18. When the slow cooker 10 is in the assembled configuration (FIG. 1), the control knob 68 extends through the generally circular face plate 71 mounted to and extending above the side wall 18b of the base 18.

Referring to FIGS. 1-5, in the preferred embodiment, a slot or recess 72 is formed within a rear portion of the base 18. The slot 72 is preferably rectangular in shape and includes two spaced-apart sidewalls 72a, 72b and a rear wall 72c that extend upwardly from or orthogonal to the bottom surface 66a of the base 18. A top wall 74, which extends generally parallel to the bottom portion 18a of the base 18 at a predetermined distance therefrom, connects the sidewalls 72a, 72b and the rear wall 72c to form the slot or recess 72. Each sidewall 72a, 72b and the rear wall 72c include an exterior surface directly exposed to the external environment of the slow cooker 10 and an interior surface facing the internal components of the slow cooker 10.

Figure 5:
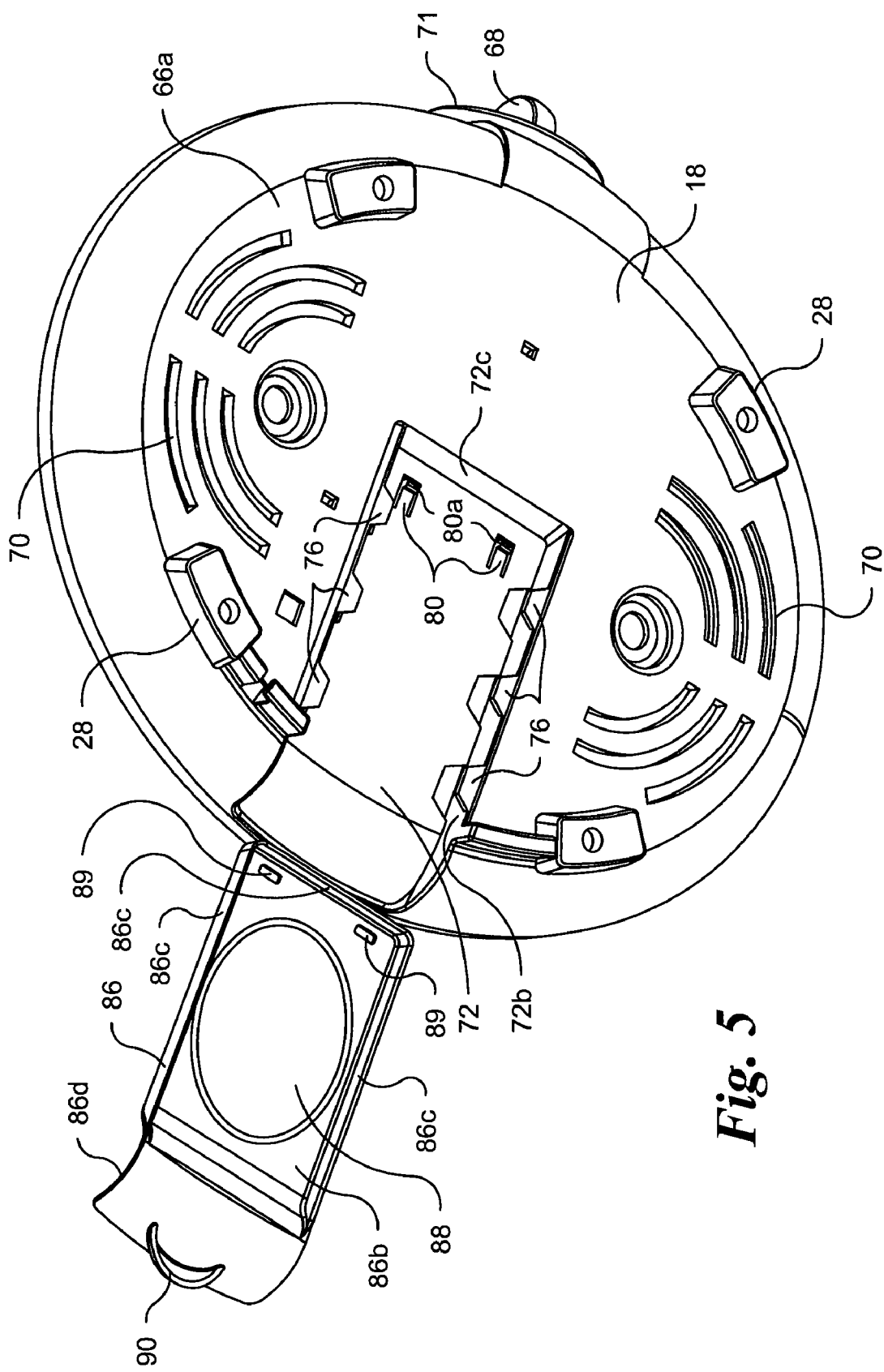
FIG. 5 is an exploded bottom perspective view of the base and the component of the slow cooker of FIG. 1.

As seen in FIGS. 3 and 5, the slot 72 includes at least one projection 76. Specifically, an interior surface of each sidewall 72a, 72b includes the at least one but preferably three or more spaced-apart projections 76 that extend generally orthogonally therefrom. The projections 76 are preferably positioned at or toward a lower or bottom portion of the interior surface of each sidewall 72a, 72b to provide a spacing or gap between a top surface of each projection 76 and a bottom surface of the top wall 74. Each projection 76 is preferably in the shape of a trapezoid or triangle, but the projections 76 are not limited to this specific shape or location. Further, at least one opening 78 is preferably formed within the top wall 74 of the slot 72 in line with or in the same vertical plane as the projections 76. In the preferred embodiment, the top wall 74 includes six spaced-apart opening 78, proximate the sidewalls 72a, 72b, that match the shape and location of the three spaced-apart projections 76 on each sidewall 72a, 72b.

Figure 4:
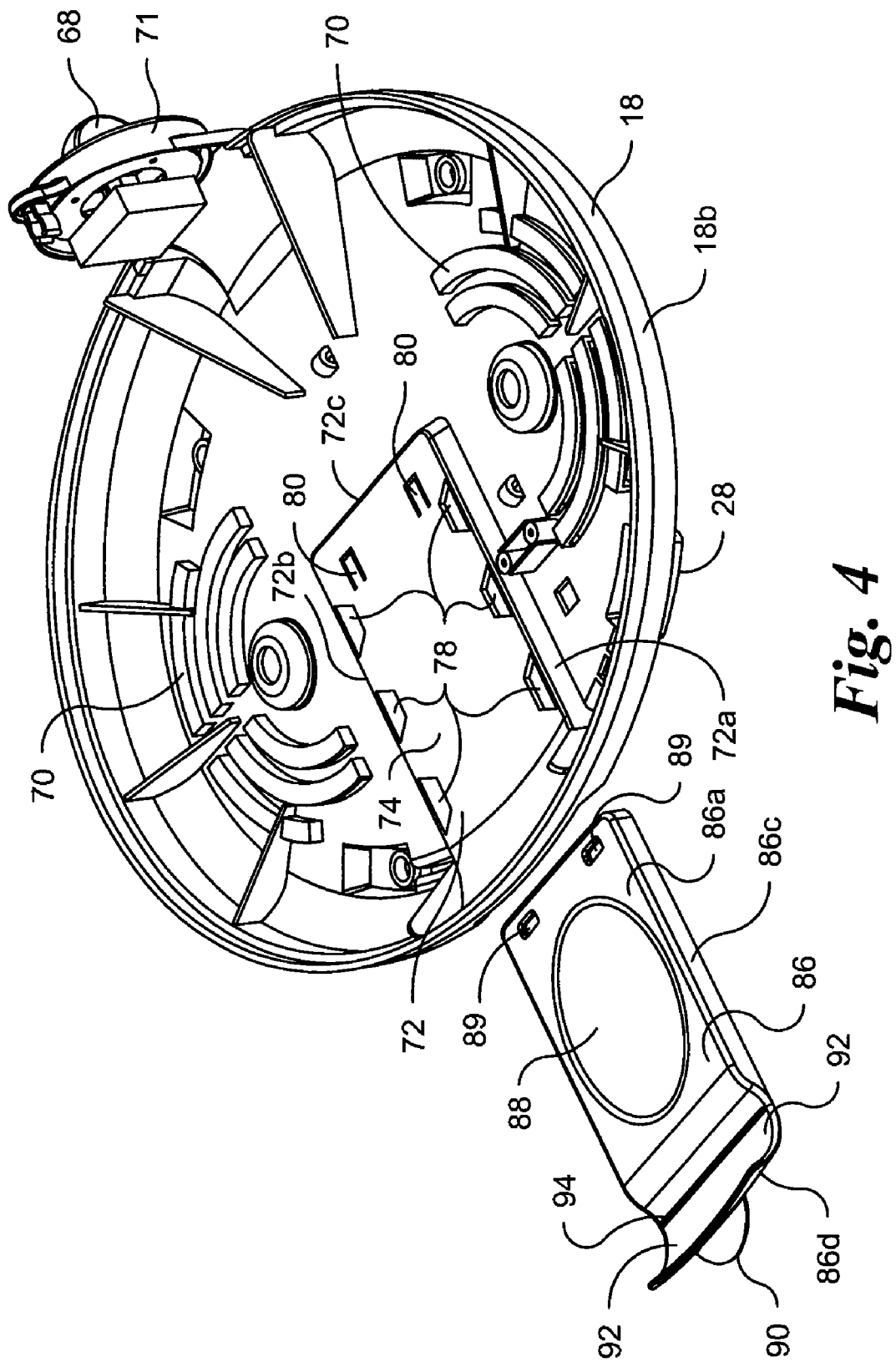
FIG. 4 is an exploded top perspective view of a base and a component of the slow cooker of FIG. 1.

Referring to FIGS. 3-5, the slot 72 further include at least one tab 80 within the top wall 74. In the preferred embodiment, the at least one tab 80 is a living hinge or cut-out having a rounded or bulbous end portion 80a. However, the at least one tab 80 may be in the form of a leaf spring or virtually any other device that allows the tab 80 to perform the function described herein. In the preferred embodiment, the top wall 74 includes two or more spaced-apart tabs 80 proximate the rear wall 72c of the slot 72. The slot 72 is not limited to the precise construction and arrangement as described above, but may include modifications and relocation or removal of structure without departing from the spirit and scope of the present invention.

Referring to FIGS. 1 and 3-6, the kitchen appliance 10 further includes a component 86 movably positionable within a portion of the kitchen appliance 10. In the preferred embodiment, the component 86 is a tray slidably positionable within a portion of the base 18, and more particularly, the tray 86 is slidably positionable within the slot 72 of the base 18. The component 86 is sized and shaped to support at least a portion of the utensil 50 above the supporting surface 11 and preferably sized and shaped to support a display card, such as an index card, receipt card, identification card or advertisement, in a substantially upright position or in a position in which writing on at least one side of the card 96 is visible to the user (see FIG. 6). The component 86 is preferably movable between a storage position (FIGS. 1 and 3), in which the component 86 is substantially within the kitchen appliance 10, and a use position (FIGS. 4, 5 and 6, for example), in which the component 86 is at least partially removed from the kitchen appliance 10. It is understood by those skilled in the art that although the tray 86 is shown and described herein as being completely removable from the base 18, the tray 86 may only be slidable/movable within the base 18 within a predetermined range such that the tray 86 cannot be completely removed from the base 18.

The component or tray 86 preferably includes a top surface 86a, and an opposing bottom surface 86b, sidewalls 86c extend generally orthogonally from at least three side surfaces of the top surface 86a and an arcuate shaped front wall 86d. In the use position, the top and bottom surfaces 86a, 86b are generally parallel to the top wall 74 of the slot 72 and the supporting surface 11. Further, in the use position, the flange or sidewalls 86c of the component 86 are generally parallel with the sidewalls 72a, 72b of the slot 72 and are generally perpendicular with respect to the supporting surface 11. As seen in FIGS. 1 and 3-5, a lip or handle 90 is preferably located on an exterior surface of the front wall 86d of the tray 86. The handle 90 is preferably arcuate in shape and generally extends orthogonally from the front wall 86d. However, the size, shape and location of the handle 90 may be modified as shown and described herein, or the tray 86 may not include the handle 90.

Referring to FIGS. 3-6, the component or tray 86 includes a recessed area or concave portion 88 in the top surface 86a thereof. The recessed area or concave portion 88 is generally ovular in shape when viewed from above or below and is generally centrally positioned within the top surface 86a of the component 86. In the preferred embodiment, the recessed area or concave portion 88 is sized and shaped to receive at least a portion of a cup-shaped segment or bowl 50a of the utensil or spoon 50. However, the recessed area or concave portion 88 may be sized and shaped to receive and/or support a variety of differently shaped and/or sized utensils or tools. The arcuate shaped front wall 86d is co-planer with the sidewall 18b of the base 18 when the component 86 is in the storage position (FIGS. 1 and 3).

Figure 6:
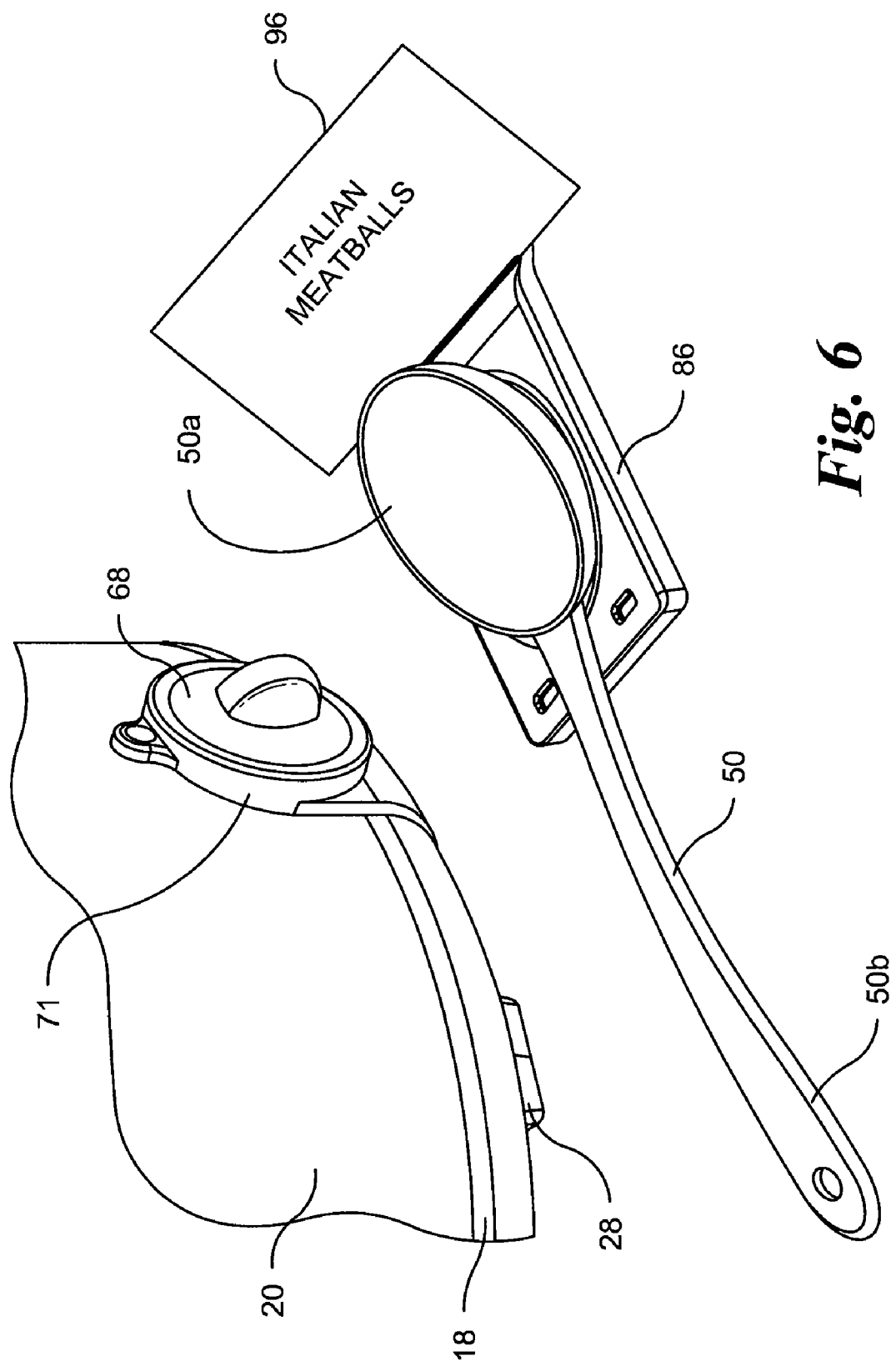
FIG. 6 is a perspective view of the component of the slow cooker supporting a display card and a portion of the slow cooker of FIG. 1.

A channel or depression 92 is preferably formed within the component or tray 86 between the handle 90 and the recessed area or concave portion 88. The channel 92 is at least partially formed by the arcuate shaped front wall 86d. Preferably, the channel 92 extends in a direction that traverses a longitudinal axis of the tray 86. As seen in FIG. 4, a rib or projection 94 preferably perpendicularly extends from an inner surface of the channel 92 and extends generally parallel with a longitudinal axis of the channel 92. The rib 94 is sized and shaped to provide a catch or to support the display card 96 in the channel 92 in a substantially upright position when the tray 86 is in the use position. Specifically, a first or lower end of the display card 96 is positioned on an outer side of the rib 94 and a second or upper end of the display card 96 rests against an interior surface of the arcuate shaped front wall 86d. In this position, the writing on at least one side of the display card 96 is easily visible to the user such that the card 96 may be used to identify the contents within the slow cooker 10 or to display a cooking recipe, for example. As seen in FIG. 6, the writing of "ITALIAN MEATBALLS" on the display card 96 is for illustrative purposes only and is not intended to be limiting, as virtually any type of writing, design, pattern, advertisement or color scheme may be displayed on the card 96.

As seen in FIGS. 1 and 3-5, the slot 72 of the base 18 is generally sized and shaped to receive the component 86 at least partially therein. However, it is preferred that the slot 72 be sized and shaped to received the entire component 86 therein. Further, the component 86 includes at least one opening 89 proximate a rear portion thereof. The at least one tab 80 of the slot 72 engages at least a portion of the at least one opening 89 when the component 86 is in the storage position. In the preferred embodiment, the component 86 includes at least two spaced-apart openings 89 that are sized and shaped to receive the bulbous end portions 80a of each tab 80 when the component 86 is in the storage position.

In use, the cooking pot 30 is placed within the heating cavity 64 of the container 60 and foodstuff is placed within the hollow interior 30a of the cooking pot 30 for cooking or warming thereof. The lid 40 is then placed on the container rim 30b and the knob 68 is turned to the proper setting for heating of the foodstuff. The spoon 50 or other utensil can be selectively used to stir or otherwise tend to the foodstuff within the interior 30a of the cooking pot 30.

When not in use, the spoon 50 may be placed within the slot 44 of the handle 42 or the bowl 50a of the spoon 50 may be placed within the recessed area or concave portion 88 of the component or tray 86 such that the bowl 50a is spaced-apart from the supporting surface 11. When the utensil 50 is at least partially supported by the tray 86, the mess often associated with the use of a utensil is confined to the tray 86 and is generally prevented from extending to the supporting surface 11. In this way, the user can be assured that the utensil 50 maintains a generally sanitary condition and the mess associated with the use of the utensil 50 can be easily cleaned-up by either placing the tray 86 into a dishwasher or cleaning the tray 86 by hand. Thereby, the need to find a free and/or sanitary surface on which to place the utensil 50 is eliminated by the present invention. Thus, storing the utensil 50 on/within the tray 86 when not serving/tending to the foodstuff reduces the amount of cleaning of the surrounding surfaces required after use of the slow cooker 10 because no additional surfaces need to be dirtied by the foodstuff dripping or otherwise being transferred from the utensil 50 to the surrounding surfaces. At most, only the area directly under the bowl 50a of the utensil 50 would require cleaning due to foodstuff and/or residue dripping from the utensil 50 onto the supporting surface 11. Furthermore, when the tray 86 is in the use position, the display card 96 may be placed in a substantially upright position, such that the user can easily identify the contents within the slow cooker 10, for example. The display card 96 may also be positioned on/within a portion of the tray 86 when the tray is in a position between the storage position and the full use position (FIGS. 4, 5, and 6) such that the user may conveniently display a sign or advertisement as to the contents of the slow cooker 10, for example.

Figure 7:
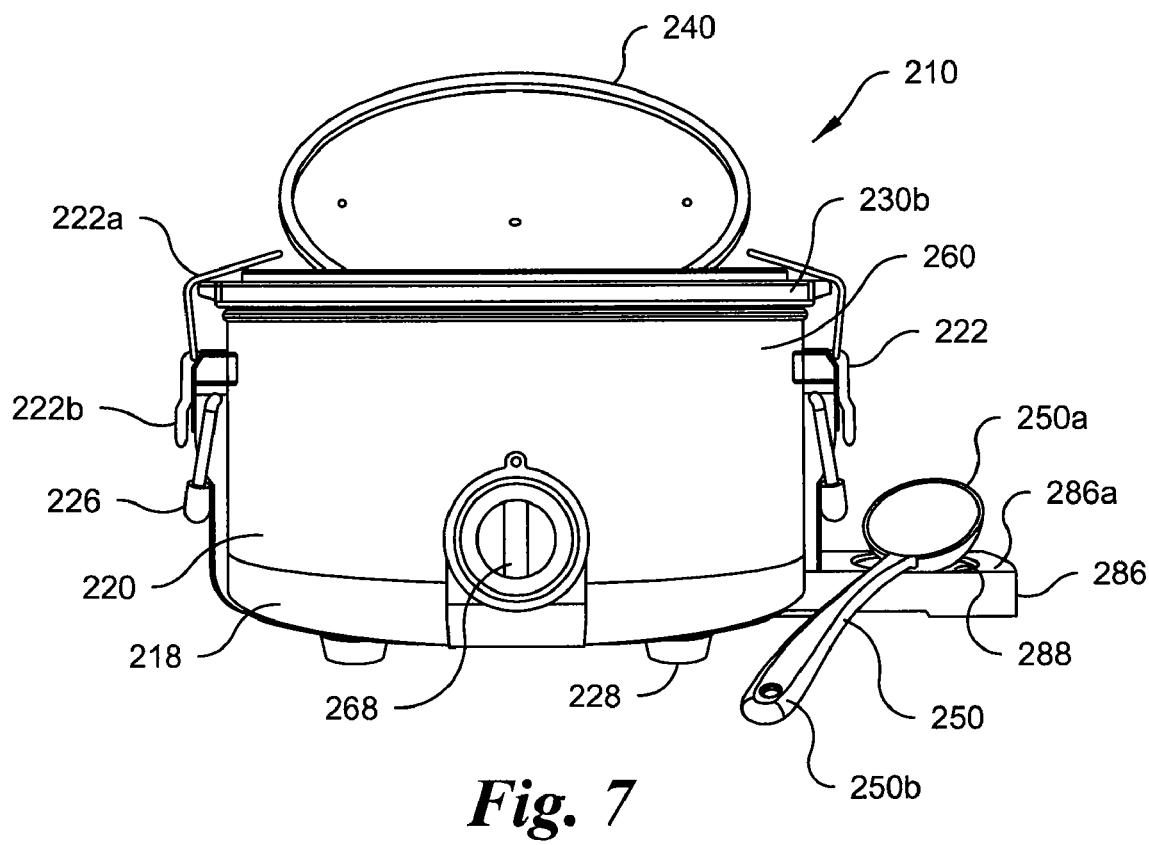
FIG. 7 is a front elevation view of a slow cooker in accordance with a second preferred embodiment of the present invention, with a lid and a component of the slow cooker in an open or use position.
Figure 8:
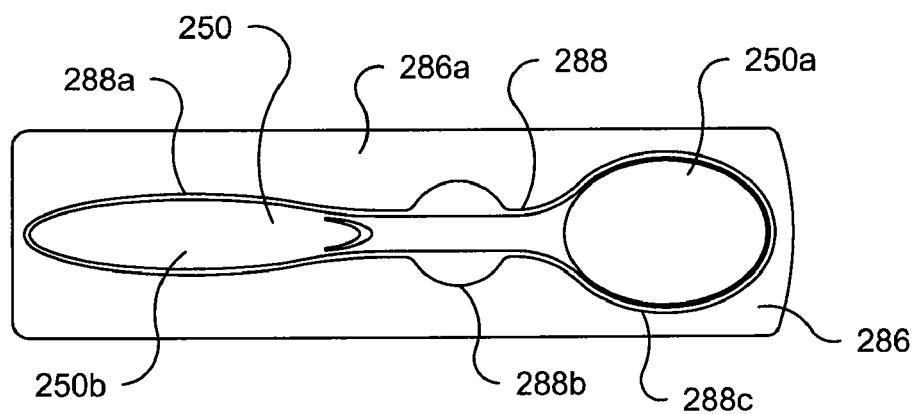
FIG. 8 is a top plan view of the component and a utensil of FIG. 7.

Referring to FIGS. 7 and 8, a second preferred embodiment of the kitchen appliance 210 is shown including like referenced numerals to indicate like elements throughout. The kitchen appliance or slow cooker 210 of the second preferred embodiment is substantially similar in structure and operation to the first preferred embodiment described above. In the second preferred embodiment, the component or tray 286 is generally elongated in shape and includes either a generally circular recessed area or concave portion 288 (FIG. 7) or a generally elongated recessed area or concave portion 288 (FIG. 8) within a top surface 286a of the tray 286. The elongated recessed area or concave portion 288 of the tray 286 is preferably sized and shaped to receive the entire utensil 50 therein for storage purposes.

Specifically, as seen in FIG. 8, the generally elongated recessed area or concave portion 288 of the tray 286 of the second preferred embodiment includes three distinct concave sections: a generally narrow and elongated section 288a, a generally circular section 288b, and a generally ovular section 288c. The narrow and elongated portion 288a is generally sized and shaped to receive a handle 250b of the utensil 250. The ovular shaped portion 228c is generally sized and shaped to receive a bowl 250a of the utensil 250. The generally circular section 288b, which is positioned between the narrow and elongated section 288a and the ovular section 288c, is generally larger than a portion of the handle 250b of the utensil 250 such that a user may more easily insert fingers around a portion of the utensil 250 to remove the utensil 250 from the recessed area or concave portion 288.

As seen in FIG. 7, the tray 286 of the second preferred embodiment is preferably movable/slidable within a slot or recess in a side surface of the base 218. However, the location and size of the slot and/or tray 286 of the second preferred embodiment may be modified within the spirit and scope of the present invention. In the storage position, the entire spoon 250 may be placed within the recessed area or concave portion 288 and the tray 280 moved/slid within the slot such that the entire spoon 250 is enclosed within the slow cooker 210. In the use position, the component or tray 286 may be at least partially removed from within the base 218 of the kitchen appliance 210 to support at least a portion of the utensil or spoon 250. Alternatively, in the use position, the component or tray 286 may be completely removed from the base 218 of the slow cooker 210 and placed directly on a supporting surface to support at least a portion of the utensil 250.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A kitchen appliance for heating foodstuff, the kitchen appliance comprising:
   an outer shell having an upper surface and a lower surface;
   a base enclosing the lower surface of the outer shell, the base being positioned on a supporting surface during heating of the foodstuff, the outer shell and base defining a heating cavity therein;
   a heating element disposed within the outer shell sufficiently proximate the heating cavity to heat the heating cavity;
   a cooking pot having a generally hollow interior and a cooking pot rim defining an opening for accessing the interior thereof, the interior being capable of retaining foodstuff therein, the cooking pot being shaped and sized to fit within the heating cavity for heating thereof by the heating element; and
   a component movably positionable within a portion of the kitchen appliance, the component being sized and shaped to support at least a portion of a utensil above the supporting surface, the component being movable between a storage position in which the component is substantially within the kitchen appliance and a use position in which the component is at least partially removed from the kitchen appliance;
   wherein the base includes a slot sized and shaped to receive the component at least partially therein, the slot including at least one projection extending orthogonally from a sidewall thereof, the component being positioned on at least a portion of the projection in the storage position.

2. The kitchen appliance according to claim 1, wherein the component is a tray slidably positionable within the slot of the base.

3. The kitchen appliance according to claim 1, wherein the base includes a bottom surface and an arcuately shaped sidewall generally extending orthogonally therefrom.

4. The kitchen appliance according to claim 3, the component including a recessed area in a top surface thereof, the recessed area being sized and shaped to receive the entire utensil therein for storage purposes.

5. The kitchen appliance according to claim 3, the component including an arcuate shaped front wall, wherein the front wall is generally co-planar with a sidewall of the base when the component is in the storage position.

6. The kitchen appliance according to claim 3, wherein the slot includes at least one tab and the component includes at least one opening, wherein the at least one tab engages a portion of the at least one opening when the component is in the storage position.

7. The kitchen appliance according to claim 3, wherein the slot includes two spaced-apart sidewalls that extend orthogonally from the bottom surface of the base.

8. The kitchen appliance according to claim 7, wherein each sidewall of the slot includes at least one projection extending orthogonally therefrom, the component being positioned on at least a portion of each projection in the storage position.

9. The kitchen appliance according to claim 1, wherein the utensil is a spoon.

10. The kitchen appliance according to claim 9, wherein the component includes a concave portion generally centrally positioned therein, the concave portion being sized and shaped to receive at least a portion of a cup-shaped segment of the spoon.

11. The kitchen appliance according to claim 1, the component further comprising:
    a handle; and
    a channel positioned between the handle and a concave portion of the component, a rib extends from an inner surface of the channel,
    wherein the rib supports a display card in the channel in a substantially upright position when the component is in the use position.

12. A kitchen appliance for heating foodstuff, the kitchen appliance comprising:
    a base;

a container defining a heating cavity therein, the container being positioned on a supporting surface during heating of the foodstuff;

a heating element disposed within the container proximate the heating cavity to heat the heating cavity;

a cooking pot having a generally hollow interior and a cooking pot rim defining an opening for accessing the interior thereof, the interior being capable of retaining foodstuff therein, the cooking pot being shaped and sized to fit within the heating cavity for heating thereof by the heating element;

a utensil for manipulating the foodstuff, the utensil have a first end and an opposite second end; and a tray slidably positionable within a portion of the container, the tray being movable between a storage position in which the tray is substantially within the container and a use position in which the tray is at least partially removed from the container, the tray having a concave portion on a top surface thereof, the concave portion being sized and shaped to support at least a portion of the first end of the utensil above the supporting surface;

wherein the base includes a slot sized and shaped to receive the tray at least partially therein, the slot including at least one projection extending orthogonally from a sidewall thereof, the tray being positioned on at least a portion of the projection in the storage position.

13. The kitchen appliance according to claim 12, the container further comprising:

an outer shell having an upper surface and a lower surface; the base enclosing the lower surface of the outer shell, the base being positioned directly on the supporting surface during heating of the foodstuff, the base having a slot formed therein, wherein the tray is slidably positionable within the slot.

14. The kitchen appliance according to claim 13, wherein the slot includes a least one tab and the tray includes at least one opening, wherein the at least one tab engages a portion of the at least one opening when the tray is in the storage position.

15. The kitchen appliance according to claim 14, wherein the slot includes two spaced-apart sidewalls that extend orthogonally from a bottom surface of the base.

16. The kitchen appliance according to claim 15, wherein each sidewall of the slot includes at least one projection extending orthogonally therefrom, the tray being positioned on at least a portion of each projection when in the storage position.

17. The kitchen appliance according to claim 12, the tray further comprising:

a handle; and a channel positioned between the handle and the concave portion, a rib extends from an inner surface of the channel, wherein the rib supports a display card in the channel in a substantially upright position when the tray is in the use position.

* * * * *